Patented Nov. 9, 1937

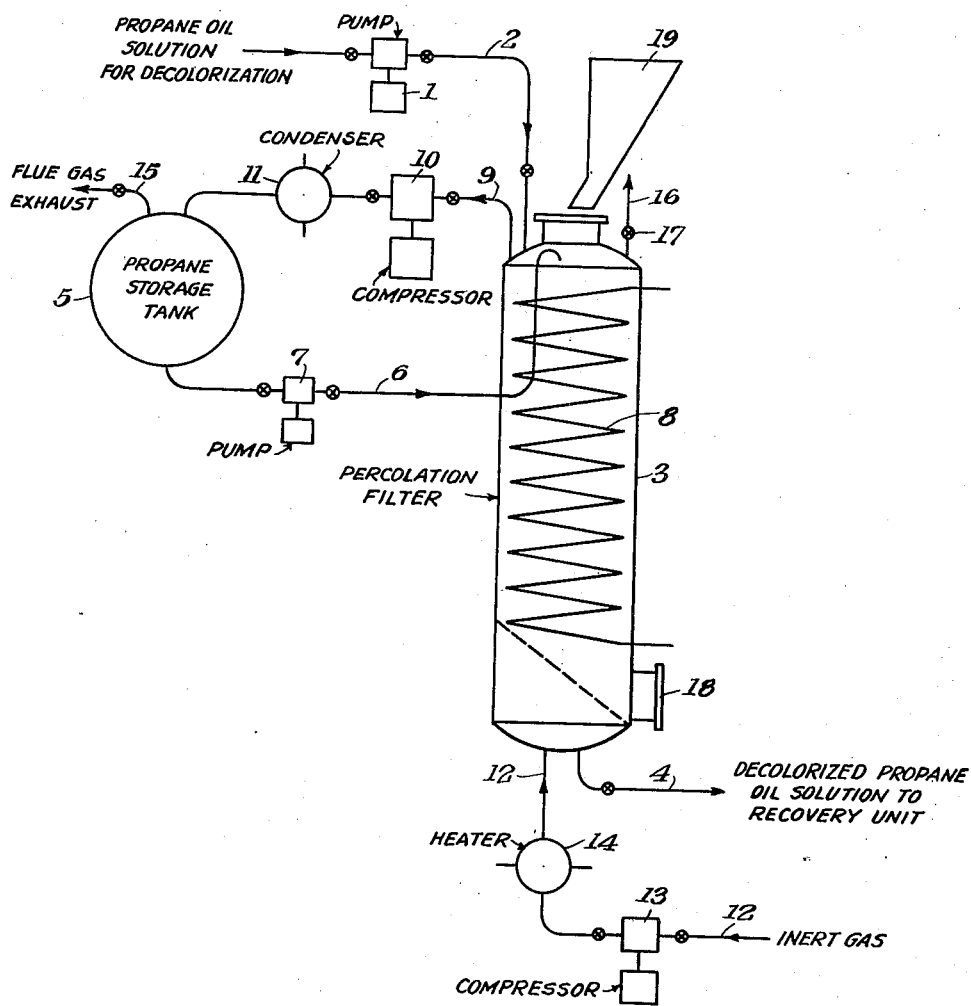

2,098,766

UNITED STATES PATENT OFFICE 2,098,766

METHOD OF RECHARGING A PRESSURE FILTER

Claude F. Tears, Warren, Pa., assignor to The Petroleum Processes Corporation, Wichita, Kans., a corporation of Kansas Application May 13, 1936, Serial No. 79,442

1 Claim. (Cl. 196—147)

This invention relates particularly to those refining operations in which the oil is treated with a liquefied normally gaseous solvent or diluent, such as propane.

The co-pending Tears applications for patents Ser. Nos. 679,073, which has issued as Patent 2,067,802, January 12, 1937, and 31,567 on Decolorization filtration are examples of such operations.

In decolorizing by percolation filtration of lubricating oils dissolved in normally gaseous liquefied hydrocarbons, it is necessary to fill the pressure vessels used in the system with gaseous hydrocarbons and to completely remove these gaseous hydrocarbons from these vessels. In filling or emptying such vessels, there is the constant danger of forming explosive mixtures of air and hydrocarbon gases.

The principal object of this invention is to overcome and prevent the possibility of formation of explosive or inflammable mixtures during operations such as mentioned.

Other objects of the invention are to accomplish this first or primary purpose in an entirely practical safe manner and with relatively simple apparatus, which can be readily incorporated with present day refining systems.

In the applications for patents referred to, heated solutions of lubricating oils in normally gaseous liquefied hydrocarbons are passed through beds of adsorbent decolorizing medium under pressure and the solvent is recovered and recycled. The adsorbent medium must be replaced from time-to-time and during such operations the pressure filters necessarily must be opened to the air. While most of the normally gaseous solvent can be removed by the recovery system, the adsorbent will still retain sufficient hydrocarbon gas to form an explosive or inflammable mixture upon admission of air. Similarly, when the filter is charged with fresh adsorbent, explosive and inflammable mixtures are created when, in again starting operations, hydrocarbon gas, ahead of the liquefied solvent, enters the filter and mixes with the air which entered during the re-charging operations.

These dangerous conditions are overcome and eliminated in the present invention by flushing or purging the system with an insert gas, such as flue gas. This and other novel features of the invention will be best appreciated by reference to the accompanying drawing, illustrating in diagrammatic fashion one of the many possible embodiments of the invention.

In the illustration, a preheated solution of lubricating oil in liquefied normally gaseous hydrocarbon is forced by pump 1, through the line 2, into the top of the pressure filter 3, containing a bed of adsorbent decolorizing medium and the decolorized oil solution passes out the bottom of the filter through line 4, to the solvent recovery unit, not shown, but which may correspond to the apparatus disclosed in the decolorizing systems above identified.

In passage through the filter, the oil is decolorized by the adsorption action of the bed of decolorizing clay or other medium. This medium as it becomes exhausted must be replaced.

In removing the filter from operation for replacement of the adsorbent, it is usual to first wash the oil from the decolorizing medium. This may be accomplished by flushing the filter with fresh liquefied normally gaseous hydrocarbon from storage tank 5, through line 6, by pump 7. During this washing operation, the filter bed may be warmed by the enclosed heating coil 8, to increase the effectiveness of the solvent.

The washing solution leaving the filter at the bottom through line 4, may be sent to the solvent recovery system or be diverted to another filter as in the patent application, Ser. 31,567. This flow may be continued until all oil is washed from the decolorizing medium.

After washing is completed, solvent is recovered from the filter bed. This may be accomplished by first venting the filter through line 9, to compressor 10, while heating the bed with coil 8. The solvent drawn off in vaporized form is thus compressed and is then condensed in condenser 11, and returned in liquefied form to storage tank 5. This venting and heating may be continued until all the vapor that it is possible to remove by this means has been taken out. In actual practice, it is impossible to remove all traces of solvent vapor in this manner.

To free the filter bed of the last traces of solvent vapor, an inert gas is used as a flushing agent. This inert gas may be flue gas, collected from any convenient source. This flushing out gas is indicated as entered up through the bottom of the filter by line 12, and given sufficient pressure to force it up through the filter bed by compressor 13. Also, in the illustration, it is shown as heated by heater 14. This compressed, heated gas thoroughly penetrates the filter bed and forces ahead of it all of the remaining solvent vapor. Being non-condensable and inert, the flue gas can be separated and exhausted to atmosphere at the propane storage tank as indicated at 15. As a possible alternative, where there is little solvent vapor left in the filter bed, the inert gas may be passed up through the filter bed after the liquid flushing operation, and be vented at the top of the filter direct to atmosphere through line 16, under control of valve 17.

The warm flue gas forced up through the filter bed completely removes all solvent vapor and leaves a non-inflammable atmosphere in the filter, making it then safe to open the filter to atmosphere. The manhole cover at the bottom of the filter at 18, may then be removed and the adsorbent be run out to a conveying system for transportation to a reactivating unit.

Fresh adsorbent may be charged into the top of the filter at 19. The first step in preparing the freshly charged filter for operation usually is to "soak" the filter bed with fresh solvent or with some of the oil solution of previous filtering operations. The air within the filter is in such operations displaced by solvent vapor and if permitted to pass into the recovery or storage units of the system may produce explosive mixtures, for instance, in the compression portion of the system.

To avoid this last described dangerous possibility, the flue gas or other inert gas, in the present invention, is again forced up through the filter bed, through the line 12, and compressor 13 and, in this particular instance, may be discharged direct to atmosphere, at the top of the filter, by way of line 16, and valve 17. Heating of the gas is not required in this operation of forcing out the air, but may be employed, if desirable under some circumstances. After thus flushing the air out of the filter, the solvent or oil solution may safely be introduced into the filter for soaking purposes and after the desired soaking period, the decolorizing filtration may be regularly proceeded with as in the patent applications mentioned. Thus with this invention, when one of a number of pressure filters is ready for a change of adsorbent, it may be vented down to atmospheric pressure and heated to distill off the gaseous solvent. The last bit of solvent may then be removed by forcing a stream of preheated flue gas or other inert gas up through the bed of adsorbent. This flow serves to distill and carry off the last traces of the solvent, without formation of any explosive or inflammable mixtures, making it then safe to open the filter to the air for charging with fresh adsorbent.

After charging with fresh adsorbent, the air in the filter may be displaced by a flow of the inert gas, which in this instance, need not be preheated and this leaves the filter with an inert atmosphere which can form no explosive or inflammable mixtures when solvent is admitted at the beginning of decolorizing operations.

The invention it will be seen, is readily applicable to present decolorizing filtration installations of the character disclosed in the Tears patent applications referred to, without change to those systems, other than the connections and equipment necessary to provide the desired inert gas purging operations described. These purging or flushing operations may be considered as part or continuing operations of the actual decolorizing steps in the Tears patent applications identified.

What is claimed is:

In oil refining by percolation of a solution of oil in liquefied normally gaseous hydrocarbon solvent under pressure through a bed of adsorbent decolorizing medium, the method of recharging a pressure filter, which comprises washing the bed of adsorbent with liquefied normally gaseous hydrocarbon under pressure to free the adsorbent of oil, heating the bed to vaporize solvent retained in the adsorbent and withdrawing the vaporized solvent, reducing the pressure on the filter bed to complete vaporization of solvent, then forcing heated inert gas which will not form an explosive mixture with the vaporized solvent remaining in the filter through the bed to drive off solvent vapor retained in the adsorbent, opening the filter and replacing the exhausted adsorbent with fresh adsorbent and then closing the filter and flushing the contained air out of the same with a flow of inert gas before admitting any solvent for succeeding decolorizing operations.

CLAUDE F. TEARS.